United States Patent
Feng et al.

(10) Patent No.: US 7,312,727 B1
(45) Date of Patent: *Dec. 25, 2007

(54) METHODS AND APPARATUS FOR IMPROVING MINIMUM HAMMING WEIGHTS OF A SEQUENCE

(75) Inventors: Weishi Feng, San Jose, CA (US); Zhan Yu, Sunnyvale, CA (US)

(73) Assignee: Marvell International Ltd., Hamilton (BM)

( * ) Notice: Subject to any disclaimer, the term of this patent is extended or adjusted under 35 U.S.C. 154(b) by 0 days.

This patent is subject to a terminal disclaimer.

(21) Appl. No.: 11/786,246

(22) Filed: Apr. 11, 2007

Related U.S. Application Data

(63) Continuation of application No. 10/639,796, filed on Aug. 12, 2003, now Pat. No. 7,218,255.

(60) Provisional application No. 60/430,904, filed on Dec. 4, 2002.

(51) Int. Cl.
*H03M 5/00* (2006.01)

(52) U.S. Cl. .............................. 341/58; 341/59; 341/60

(58) Field of Classification Search .......... 341/50–107; 714/739, 738, 742, 268
See application file for complete search history.

(56) References Cited

U.S. PATENT DOCUMENTS

| | | | |
|---|---|---|---|
| 5,898,394 A | 4/1999 | Kobayashi et al. ........... | 341/58 |
| 6,177,890 B1 | 1/2001 | Keirn et al. ................... | 341/59 |
| 6,185,717 B1 | 2/2001 | Fukunaga et al. | |
| 6,351,538 B1 | 2/2002 | Uz .............................. | 380/201 |
| 6,360,347 B1 | 3/2002 | Walters, Jr. | |
| 6,384,747 B1 | 5/2002 | Reed et al. | |
| 6,449,111 B1 | 9/2002 | Kool et al. | |
| 6,557,136 B1* | 4/2003 | Friedmann .................. | 714/152 |
| 6,738,935 B1 | 5/2004 | Kimmitt ..................... | 714/701 |
| 6,792,566 B2 | 9/2004 | Chen et al. ................. | 714/739 |
| 6,897,792 B1 | 5/2005 | Feng ........................... | 341/59 |
| 6,925,371 B2* | 8/2005 | Yasui et al. .................... | 701/72 |
| 6,986,094 B2 | 1/2006 | Grimsrud .................... | 714/759 |
| 7,006,016 B1 | 2/2006 | Feng ........................... | 341/58 |
| 7,023,881 B1 | 4/2006 | Bendak et al. ............. | 370/470 |
| 7,034,719 B2* | 4/2006 | Shim et al. ................... | 341/58 |
| 7,142,133 B2* | 11/2006 | Shim et al. .................... | 341/51 |
| 7,248,188 B2* | 7/2007 | Ito et al. ....................... | 341/58 |
| 2001/0007578 A1 | 7/2001 | Ran et al. | |
| 2002/0122469 A1 | 9/2002 | Doetsch et al. ............. | 375/146 |
| 2003/0066014 A1 | 4/2003 | Van Dijk et al. ........... | 714/774 |
| 2003/0135798 A1* | 7/2003 | Katayama et al. .......... | 714/710 |

OTHER PUBLICATIONS

U.S. Appl. No. 10/423,552, filed Apr. 25, 2003, Feng et al.

\* cited by examiner

*Primary Examiner*—Linh Nguyen

(57) ABSTRACT

A communications channel comprises a seed selector that selectively removes X M-bit symbols of user data from a seed set comprising Y M-bit symbols and that selects a scrambling seed from Y-X symbols remaining in the seed set, where X, Y and M are integers greater than one. A Hamming weight coding device that determines a Hamming weight of symbols of scrambled user data that are generated based on the user data and the selected scrambling seed and that selectively codes the symbols depending upon the determined Hamming weight.

31 Claims, 5 Drawing Sheets

METHODS AND APPARATUS FOR IMPROVING MINIMUM HAMMING WEIGHTS OF A SEQUENCE

CROSS-REFERENCE TO RELATED APPLICATIONS

This application is a continuation of U.S. patent application Ser. No. 10/639,796, filed on Aug. 12, 2003, U.S. Pat. No. 7,218,255, which claims the benefit of U.S. Provisional Application No. 60/430,904, filed on Dec. 4, 2002. The disclosures of the above applications are incorporated herein by reference in their entirety.

FIELD OF THE INVENTION

The present invention relates to data coding in a communications channel, and more particularly to data coding that eliminates unwanted bit patterns in a communications channel.

BACKGROUND OF THE INVENTION

Magnetic storage systems such as disk drives include a magnetic medium or platter with a magnetic coating that is divided into data tracks. The data tracks are divided into data sectors that store fixed-size data blocks. A read/write head typically includes a write circuit and a write element such as an inductor that selectively generates positive and negative magnetic fields that are stored by the magnetic medium. The stored positive and negative fields represent binary ones and zeros. The read/write head includes an element such as a magneto-resistive element that senses the stored magnetic field to read data from the magnetic medium. A spindle motor rotates the platter and an actuator arm positions the read/write head relative to the magnetic medium.

Magnetic storage systems typically code user data using Run Length Limited (RLL) code. RLL coding eliminates sequences in the user data that may degrade the performance of timing circuits of the magnetic storage system. For example, an RLL code enforces constraints on the number of consecutive ones and/or zeros that are permitted in the data. The efficiency of the RLL code is typically measured in terms of a code rate. For every m bits of user data, an encoded word with n bits is written to the storage media. RLL codes are used to eliminate unwanted bit patterns in the original data and typically do not have error correction capability.

Referring now to FIG. 1, a write path 10 in a conventional data storage system includes an error correction coding (ECC) encoder (ENC) 12 that receives user data. ECC ENC 12 generates cyclic redundancy check (CRC) and/or ECC bits that are appended to the user data. The user data, CRC bits, and/or ECC bits are output by ECC ENC 12 to an input of XOR gate 14. Another input of XOR gate 14 receives an output of a data scrambler 16, which generates a pseudo-random binary sequence. The scrambler here is used here purely for the purpose of randomizing data and does not guarantee any sort of RLL constraint.

A scrambled output of XOR gate 14 is input to a run length limited (RLL) ENC 18. RLL ENC 18 encodes bit strings to prevent unwanted data patterns that violate the constraint and outputs a bit stream to a read channel (R/C). Typically, RLL ENC 18 converts a block of $N_{RLL}$ bits into ($N_{RLL}$+1) bits to avoid the unwanted data patterns.

Referring to FIG. 2, a read path 20 of a data storage system includes an RLL decoder (DEC) 22 that receives the bit stream from the read channel and decodes the bit stream. An output of RLL DEC 22 is input to an XOR gate 24. A scrambler 26, which is the same as scrambler 16, generates the pseudo-random binary sequence that is input to another input of XOR gate 24. An output of XOR gate 24 is input to an ECC DEC 26, which performs ECC decoding and outputs the user data. RLL ENC 18 eliminates unwanted bit patterns. However, the RLL coding also reduces data storage capacity. In other words, RLL coding increases channel bit density (CBD), which reduces SNR and leads to lower reliability.

SUMMARY OF THE INVENTION

A communications channel includes a buffer that receives symbols of user data including a plurality of M-bit symbols. A seed selector receives the M-bit symbols of the user data, selectively removes symbols of the user data from a seed set, and selects a scrambling seed from symbols remaining in the seed set. A scrambling device that communicates with the seed selector and the data buffer generates scrambled user data using the user data and the selected scrambling seed. A Hamming weight coding device determines a Hamming weight of symbols of the scrambled user data and selectively codes the symbols depending upon the determined Hamming weight.

A write path in a communications channel according to the present invention includes an encoder that receives a scrambled user data symbol sequence. The encoder compares the user data to a seed set and selects a token from unused symbols in the seed set. The encoder passes pairs of adjacent symbols of the scrambled user data sequence unchanged or, utilizing the selected token, outputs a pair of symbols having an improved Hamming weight.

A write path in a communications channel according to the present invention includes an encoder that receives a scrambled user data symbol sequence. The encoder compares the user data to a seed set and selects a first token and a second token from unused symbols in the seed set. The encoder also passes pairs of adjacent user symbols of the user data sequence unchanged or, utilizing either the first token or the second token dependent upon the adjacent user symbols, encodes an output having an equal number of bits as a pair of adjacent user symbols, depending upon a total Hamming weight of the pairs of adjacent user symbols.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

Figure 1:
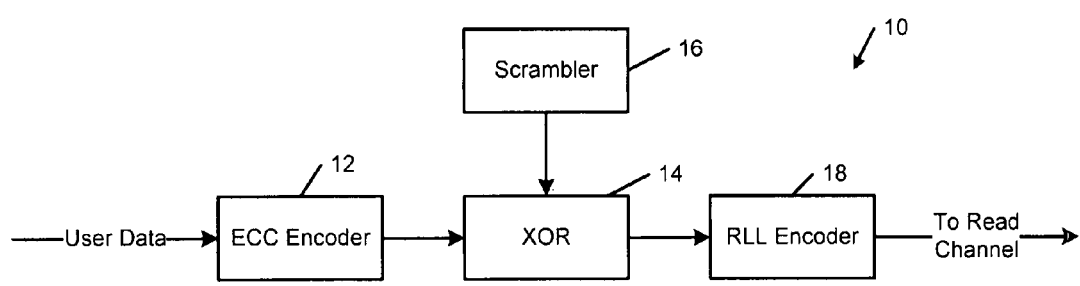
FIG. 1 is a block diagram of a write path in a data storage system according to the prior art.
Figure 2:
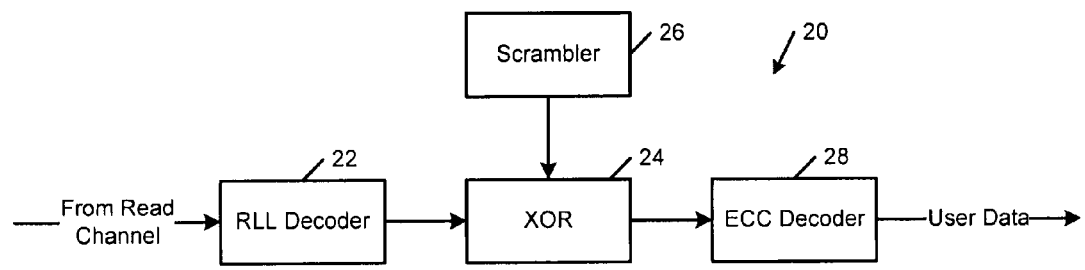
FIG. 2 is a block diagram of a read path in a data storage system according to the prior art.

The following description of the preferred embodiment(s) is merely exemplary in nature and is in no way intended to limit the invention, its application, or uses. For purposes of clarity, the same reference numbers will be used in the drawings to identify similar elements.

Hamming weight refers to the number of non-zero symbols in a symbol sequence. For binary signaling, Hamming weight refers to the number of "1" bits in the binary sequence. Low Hamming weight sequences (sequences with many zeros) adversely affect synchronization times and timing loops. Likewise, high Hamming weights cause similar problems. Therefore, there have been attempts to improve the Hamming weight of scrambled sequences. However, a trade-off between efficiency and effectiveness usually must be made.

Figure 3:
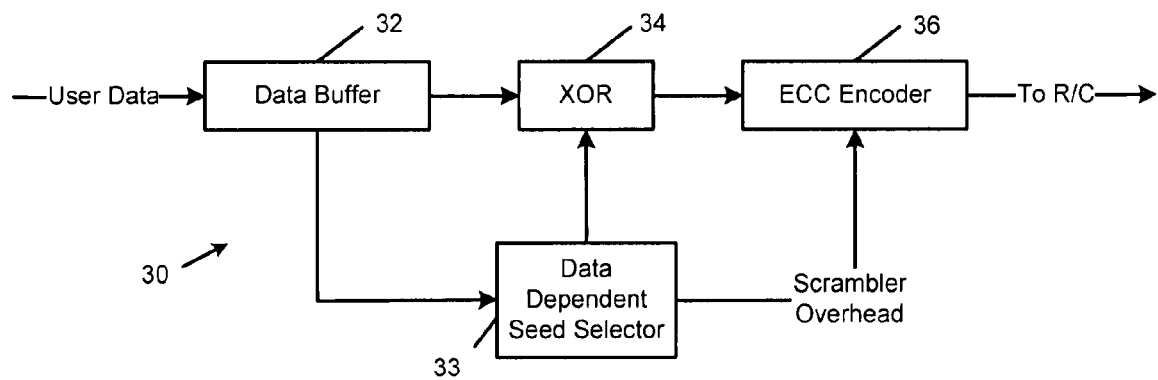
FIG. 3 is a block diagram of a data dependent scrambler according to the present invention.

Referring to FIG. 3, a write path 30 for a data storage system loads user data into storage buffer 32. It will be appreciated that write path 30 may be a serial path or a parallel path. A data dependent scrambling device 33 searches for a suitable scrambling sequence based on the user data stored in buffer 32 and outputs the selected scrambling sequence to an input of XOR device 34. The term data buffer as used herein is defined as any device that stores blocks of user data while data dependent scrambling device 33 identifies the scrambling sequence or seed that is used to scramble the user data. The scrambling sequence is data dependent in that it depends upon the user data portion on the data buffer 32. In some implementations, the blocks of user data may include 4096 bits.

A delayed output of data buffer 32 is also output to XOR device 34 when the scrambling sequence is found. The delay of data buffer 32 is sufficient to allow the scrambling sequence to be generated by the data dependent scrambler 33. An output of XOR device 34 and overhead bits that are output by scrambler 33 are input to an ECC ENC 36, which appends any scrambler overhead bits to the scrambled user data. ECC ENC 36 generates ECC and/or CRC bits based on the scrambled user data and/or the overhead bits.

In some configurations of the present invention, a 10-bit symbol user data sequence $D=\{D_{N-1}, D_{N-2}, \ldots, D_0\}$ of size N is scrambled. For example, when the block of user data includes 4096 bits, there are 410 symbols. A scrambling seed A is found that is different from any symbols in data sequence $D=\{D_{N-1}, D_{N-2}, \ldots, D_0\}$. Finding such a seed is always possible if $N<2^{10}$. More generally, if the number of bits in a symbol is M, it is always possible to find such a seed if $N<2^M$, simply because not all of the $2^M$ different possible symbols can be included in a data sequence of fewer than $2^M$ symbols. Because scrambling seed A is different from each symbol in the data sequence, it will differ from each symbol in the data sequence in at least one bit position. A scrambling sequence is then formed by repeating symbol A for N times. A bit-wise XOR of scrambling sequence $\{A, A, \ldots, A\}$ with data sequence $D=\{D_{N-1}, D_{N-2}, \ldots, D_0\}$ is performed to obtain a scrambled sequence $C=\{C_{N-1}, C_{N-2}, \ldots, C_0\}$.

Referring again to FIG. 3, user data input to data buffer 32 is immediately passed on to data dependent scrambler 33 to analyze so that seed A can be determined. Data buffer 32 also stores this user data. After seed A is determined, data buffer 32 releases the stored data to XOR device 34 while data dependent scrambler 33 repeats the seed pattern A until the stored data in data buffer 32 is exhausted.

The above method produces a scrambled sequence C in which every ten bit symbol $C_i$, (i=N−1, ..., 0) is non-zero, every ten bit symbol $C_i$, (i=N−1, ..., 0) has a minimum Hamming weight of one, and the scrambled sequence C has a minimum Hamming weight of 10%. Each ten bit symbol $C_i$ is non-zero because scrambling seed A is different from each symbol $D_i$ in the data sequence by at least one bit. When A is XORed with any $D_i$, the result will have a "1" in any bit position in which A differs from $D_i$, and there is at least one such bit position in every $D_i$. Thus, every ten bit symbol $C_i$ has a Hamming weight of at least one, which is 10% of the bits in each $C_i$. Because no symbol in the entire sequence C has a Hamming weight less than the minimum 10%, the scrambled sequence has a minimum Hamming weight of 10%. The procedure for generating scrambled sequence C can readily be generalized for any symbol size M, provided that $N<2^M$. The resulting scrambled sequence will have a minimum Hamming weight of 1/M.

For a ten bit symbol size, i.e., M=10, there are $2^{10}$ possible binary symbols. These symbols form a seed set S. Given a data sequence $D=\{D_{N-1}, D_{N-2}, \ldots, D_0\}$ with $N<2^{10}$, a scrambling seed A can be produced from S by designating every $D_i$ in S as a "used symbol," and picking an unused symbol in S as the scrambling seed A. This procedure works for any symbol length M, provided that $N<2^M$.

Because each symbol in the scrambled sequence has a Hamming weight of at least 1, the worst case run of zeros occurs when a symbol with Hamming weight 1 having the "1" at the beginning of the symbol is adjacent a symbol with Hamming weight 1 having the "1" at the end of the symbol. The worst case run of zeros thus cannot be greater than two less than twice the number of bits in a symbol, or 18 (for 10-bit symbols). In some applications, including at least some storage systems, it is required that the scrambled sequence also not contain long runs of ones. This requirement can be met by disallowing the all-ones symbol from appearing in scrambled sequence C. The scrambling seed search is thus modified as follows, with the requirement $2N<2^M$, where M is 10 for ten-bit symbols. For every $D_i$, designate $D_i$ and $\overline{D}_i$ in S as a "used symbol," and select an unused symbol in S as the scrambling seed A.

Designating both $D_i$ and $\overline{D}_i$ as used symbols explains the requirement $2N<2^M$; more particularly, twice as many symbols are designated as used for the same number of symbols in D. Thus, there can be fewer symbols in a data sequence D. However, the procedure avoids long runs of both ones and zeros by making it impossible for the all-zeroes symbol to occur (by the elimination of all $D_i$ from the universe of possible scrambling seeds) and by making it impossible for the all-ones symbol to occur (by the elimination of all $\overline{D}_i$ from the universe of possible scrambling seeds). Thus, each symbol $C_i$ must include a zero and a one. The longest possible all-ones sequence and the longest possible all-zeros sequence are both two bits shorter than twice the symbol length.

The above steps are suitable for producing a scrambled sequence C where every 10-bit symbol $C_i$, (i=N−1, ..., 0) is non-zero, where every 10-bit symbol $C_i$ has a minimum Hamming weight of 1, and the scrambled sequence C has a minimum Hamming weight of 10%. The scrambler overhead is M bits in this example.

Figure 4:
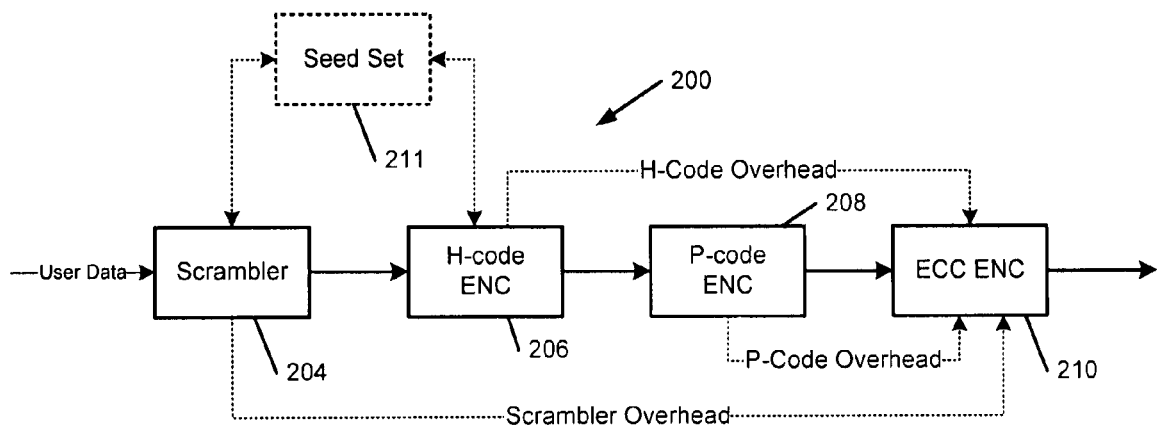
FIG. 4 is a block diagram representative of a write path according to the present invention.
Figure 5:
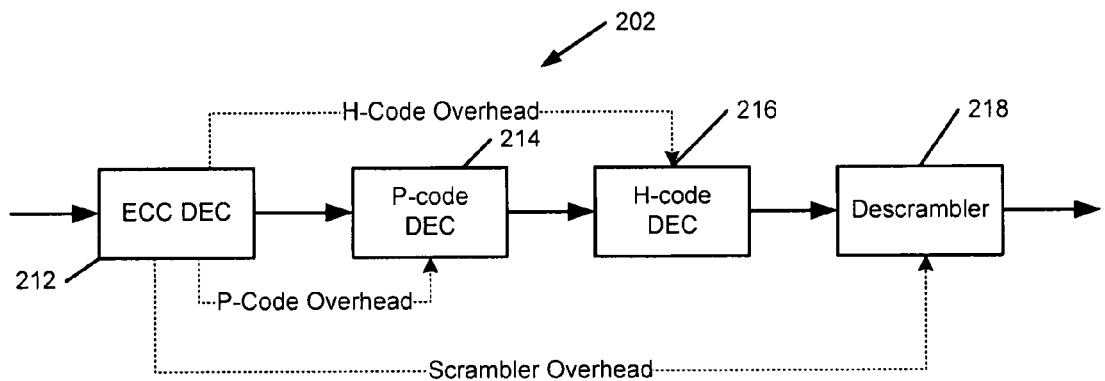
FIG. 5 is a block diagram representative of a read path according to the present invention.

Referring now to FIGS. 4 and 5, a write path 200 is utilized in conjunction with a read path 202. Write path 200 comprises a scrambler 204, an H-code encoder 206, a P-code encoder 208, and an ECC encoder 210. A table storing a seed set is shown at 211. Read path 202 comprises an ECC decoder 212, a P-code decoder 214, an H-code decoder 216, and a descrambler 218. In these configurations, an "H-code" is a code that improves the Hamming weight of a scrambled sequence and that has H-code overhead as shown. "P-code" is a post-coding that performs bit interleaving, segmenting and inversion, and/or all-zero symbol replacement and that has P-code overhead as shown. "P"-code encoding and decoding is described further in "Improved Data Coding for Enforcing Constraints on Ones and Zeros in a Communications Channel,", U.S. patent application Ser. No. 10/423,552, which was filed on Apr. 25, 2003 and which is hereby incorporated by reference in its entirety.

To improve the worst case Hamming weights to 15% in some configurations, a token is selected and used to indicate H-coding 206 for low weight two-symbol code groups. This token is unique when the data gets to H-code decoder 216 even though bit interleaving in P-code encoder 208 may generate symbols equal to the token, there is no ambiguity because P-code decoder 214 processes data in read path 202 prior to H-code decoder 216. In some configurations in which the all-zero symbol and the all-one symbol are used as indicators in the P-code, neither of these two symbols is used as the token.

Figure 6:
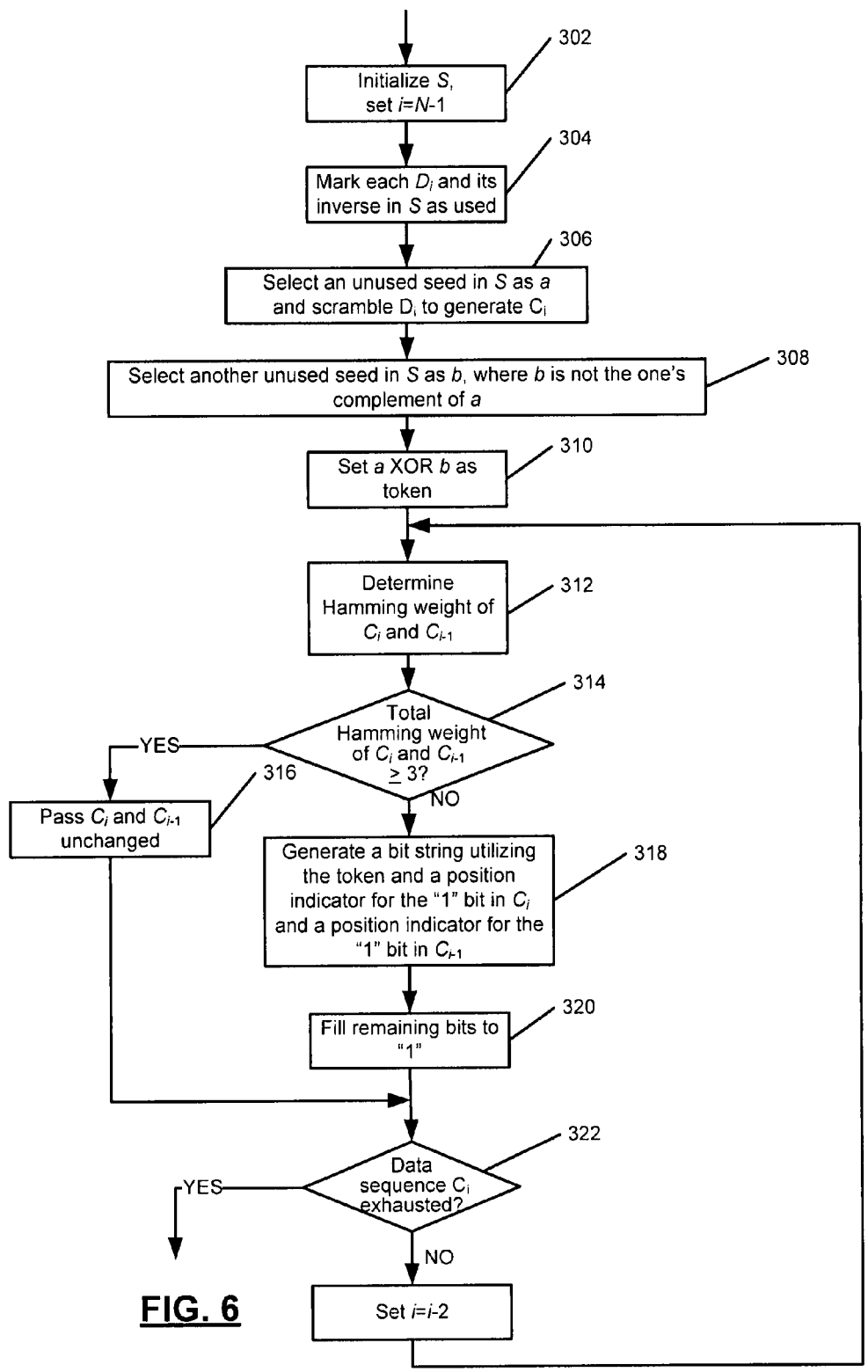
FIG. 6 is a flowchart illustrating steps for achieving a minimum Hamming weight of 15% when used with 10-bit symbols.

Referring now to FIG. 6, for a data sequence $C=\{C_{N-1}, C_{N-2}, \ldots, C_0\}$ of size N, where each $C_i$ is an M-bit symbol and $2N<2^M-3$, at 302, a table of possible seeds S and a loop index i are initialized.

In step 304, each $D_i$ in D and $\overline{D}_i$ are removed from S as a possible seed. This step may be performed by looping through all N members of data sequence D and setting bits in the table of possible seeds S to indicate that the symbols encountered in data sequence D are not available for use as a seed. At least three seeds must remain.

In step 306, one of the available seeds in S is selected to be the seed of the scrambling sequence, which is designated here as seed a. In step 308, another valid seed, b, which is not a one's complement of the true seed a, is selected. Because at least two seeds in S other than a remain, it is always possible to select a remaining seed b that is not a one's complement of a. The scrambled data sequence $C=\{C_{N-1}, C_{N-2}, \ldots, C_0\}$ is generated by XOR the data sequence $D=\{D_{N-1}, D_{N-2}, \ldots, D_0\}$ with the scrambling sequence $\{a, a, \ldots, a\}$.

In step 310, the symbol a⊕b is determined, where the typographic symbol ⊕ denotes the XOR operator, and the symbols so determined is stored as the token. Because of the manner in which it is selected, the token has a Hamming weight of at least one and is not the all-one symbol. Both a and b shall be protected by ECC meaning that the CRC/ECC redundancy symbols should be generated based on a and b and the processed user data.

Starting at the first two symbols $C_{i-1}, C_{i-2}$ in step 312, where i=N-1, the Hamming weight of the two-symbol group of 10-bit symbols is determined. If the Hamming weight is at least three (15%) in step 314, H-code encoder 206 passes its input data unmodified to P-code encoder 208 in step 316. Otherwise, it is necessarily the case that both symbols of the two symbol group have Hamming weight one. In this case, an 18-bit string is generated in step 318 utilizing the 10-bits of the stored token in combination with two four-bit indications of the positions of the ones in each of the two data symbols. For example, an ordered concatenation of the token and the two four-bit indications can be used. And the two four-bit indications can be made nonzero by numbering the position of the bit "1" in a weight-1 symbol from 1 to 10.

The combination of the token and the two four-bit representations is only 18 bits, which is less than the original total of 20 bits occupied by the two original two-symbol group of 10-bit symbols. Therefore, in step 320, the remaining two bits are set to one or zero in a consistent manner, thereby filling up all 20 bits. In step 320, if the entire data sequence C is exhausted, the procedure is complete, until another data sequence is provided. Otherwise, in step 322, the next two data symbols are repeated and processed, starting in step 312.

As a result, at very small computational and component cost, the worst case Hamming weight is 15% in these configurations of the present invention, because at least three of the 20 bits are "1"s. More particularly, any two-symbol group having a Hamming weight greater than 15% is passed through unchanged, and any group having a lower weight is coded to have at least three "1"s: a token having a Hamming weight not less than 1 and two four-bit indications each having a Hamming weight at least 1.

The mapping of 10-bit symbols of Hamming weight 1 into four bits each is explained by the following example. A symbol such as 0010000000 has only one "1" bit in it. A four-bit code is sufficient to represent the bit position of the "1" bit, because there are only ten bit positions (more particularly, there are fewer than $2^J=16$ bit positions, where J=4 is the length of the bit-position mapping code). Any consistent mapping can be used to indicate the bit position provided that the four-bit indication is not all-zero. For example, a simple binary representation of the bit position can be used, counting the bit position consistently either from the left (thus mapping into 0011) or from the right (thus mapping into 1000).

Skilled artisans will understand that the configuration described above can be modified to work with different M (the number of bits in the symbols), J (the length of the bit-position mapping code), and/or K (the number of symbols in a group, which in the case of the above example, is 2). Not all of these modifications will result in minimum Hamming weights of exactly 15%.

Figure 7:
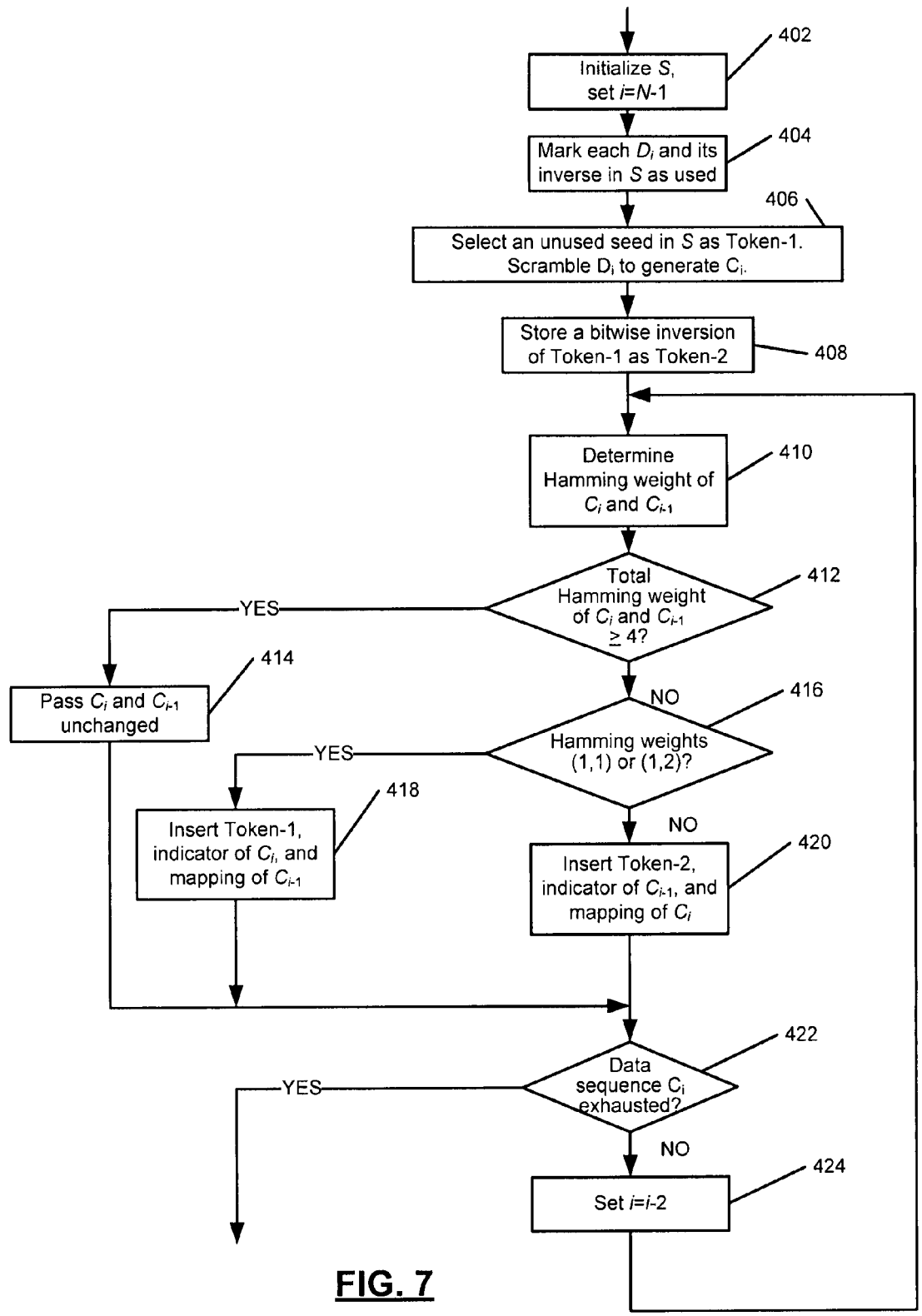
FIG. 7 is a flowchart illustrating steps for achieving a minimum Hamming weight of 20% when used with 10-bit symbols.

Some configurations of the present invention utilize an alternate and presently preferred H-code that is shown in FIG. 7 to provide a worst case Hamming weight of 20% with 10-bit symbols. Some of these configurations utilize a 10-bit to 6-bit lookup table that maps all 10-bit symbols of weight one or two into 6-bit patterns having weight of at least two. The 10-bit to 6-bit lookup table can be provided in a permanent memory such as a ROM, because the table does not depend upon any data sequence and there is no need for the table to change. There are 10 10-bit symbols having weight one and 45 10-bit symbols having weight two. Thus, there are 55 10-bit symbols to map. There are 15 6-bit patterns of weight 2, 20 6-bit patterns of weight 3, 15 6-bit patterns of weight 4, 6 6-bit patterns of weight 5, and 1 6-bit pattern of weight 6. Thus, the 55 10-bit symbols of weight one or two can be mapped into 55 of the 57 possible 6-bit patterns of weight two or more. As a result, a reversible correspondence, such as a one-to-one correspondence, is possible.

Referring now to FIG. 7, in steps 402, 404, and 406, a token is selected in a manner essentially similar to that described above in steps 302, 304, and 306. This token is stored as Token-1. In step 408, a bit-wise inversion of Token-1 is performed and the result is stored as Token-2.

H-code encoder 16 encodes as follows: The Hamming weight of a two-symbol group is determined in step 410. If the total Hamming weight is at least four at 412, the data is passed unchanged to P-code encoder 208 at 414. The resulting two-symbol group has a Hamming weight of at least 20%, i.e., at least four bits out of 20 are "1"s.

If the Hamming weight of the two symbols is either (1,1) or (1,2) in step 416, then in step 418, H-code encoder 16 inserts Token-1 in a consistent manner, for example, on the left. The first four bits of the second symbol are set to indicate the position of the 1 in the weight one symbol, for example, using a positional mapping such as that described above. Any mapping can be used, but the 4-bit all zero pattern is excluded. A six bit pattern is found by determining which of the 6-bit patterns of weight 2 or more corresponds to the second data symbol. For example, a look-up table can be used to make this determination. The six-bit pattern is concatenated or otherwise included with Token-1 and the four bits indicating the position of the 1 in the weight one symbol so that a string of 20 bits is created. These 20 bits have at least two "1" bits from inclusion of the 6-bit pattern, at least one "1" bit from the token, and at least one "1" bit from the 4-bit code representing the bit position in the weight one symbol. The resulting 20 bits include at least 4 "1"s, so the Hamming weight is at least 20%. It will be appreciated that the presence of Token-1 at a specific position within the 20-bit pattern identifies this case to the decoder.

Because zero-weight symbols are not used, the only remaining possibility is that the Hamming weight of the two symbols is (2,1). In step 420, Token-2 is inserted on the left. The first four bits of the second symbol are used to indicate the position of the 1 in the weight one symbol, and the second symbol is converted to a six bit symbol. It will be recognized that the resulting 20 bits can be identified by a decoder from the presence of Token-2 at a specific position within the 20-bit pattern instead of Token-1, or some other pattern of bits. It will also be recognized that the minimum Hamming weight in this case is also 20% for reasons quite similar to the case above in which the two symbols have Hamming weight (1,2).

If the data sequence is exhausted in step 422, the procedure is done, and can be restarted when new data is available. Otherwise, the next to data symbols are selected in step 424 and the procedure loops back to step 410.

Application specific integrated circuits, dedicated circuits, software and a processor, discrete circuits, and/or any other suitable manner can be used to implement configurations described herein. Thus, items referred to as "devices" in the examples described above can be, but are not necessarily discrete components.

It will thus be appreciated that methods and apparatus of the present invention provide increased Hamming code weights for communications channels, and/or provide coded symbol sequences on such channels without excessively long strings of "1"s and/or "0"s. Moreover, computational overhead is very small and simple buffers can be used, as no more than four consecutive symbols are needed in any iteration or step that takes place in configurations of the present invention. In some configurations, only two consecutive symbols are needed.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, the specification and the following claims.

What is claimed is:

1. A communications channel comprising:
   a seed selector that selectively removes X M-bit symbols of user data from a seed set comprising Y M-bit symbols and that selects a scrambling seed from Y-X symbols remaining in said seed set, where X, Y and M are integers greater than one; and
   a Hamming weight coding device that determines a Hamming weight of symbols of scrambled user data that are generated based on said user data and said selected scrambling seed and that selectively codes said symbols depending upon said determined Hamming weight.

2. The communications channel of claim 1 further comprising:
   a data buffer that communicates with said seed selector and that stores said user data; and
   a scrambling device that communicates with said seed selector and said data buffer and that generates said scrambled user data using said user data and said selected scrambling seed.

3. The communications channel of claim 1 wherein said communications channel is implemented in a data storage system.

4. The communications channel of claim 1 wherein said Hamming weight coding device determines a Hamming weight of adjacent symbols in said scrambled user data.

5. The communications channel of claim 1 wherein said seed selector removes inverses of symbols in said user data from said seed set.

6. The communications channel of claim 4 wherein said Hamming weight coding device selects an unused seed S as a first token and a bit-wise inversion of S as a second token.

7. The communications channel of claim 6 wherein said Hamming weight coding device passes said two adjacent symbols unchanged when said Hamming weight of said two adjacent symbols is greater than or equal to 4.

8. The communications channel of claim 7 wherein when said Hamming weight of said two adjacent symbols is one of (1,1) and (1,2), said Hamming weight coding device replaces a first of said two adjacent symbols with said first token and replaces a second of said two adjacent symbols with a bit indicator of said first of said two adjacent symbols and a mapping of said second of said two adjacent symbols.

9. The communications channel of claim 8 wherein said bit indicator indicates a position of a one bit in said first of said two adjacent symbols.

10. The communications channel of claim 9 wherein said bit indicator includes I bits and said mapping maps M bits of said second of said two adjacent symbols to M-I bits.

11. The communications channel of claim 10 wherein when said Hamming weight of said two adjacent symbols is (2,1), said Hamming weight coding device replaces a first of said two adjacent symbols with said second token and a second of said two adjacent symbols with a bit indicator of said second of said two adjacent symbols and a mapping of said first of said two adjacent symbols.

12. The communications channel of claim 11 wherein said bit indicator indicates a position of a one bit in said first of said two adjacent symbols.

13. The communications channel of claim 11 wherein said bit indicator includes I bits and said mapping maps M bits of said first of said two adjacent symbols to M-I bits.

14. The communications channel of claim 1 wherein said Hamming weight coding device selects a first unused seed A and a second unused seed B, wherein A is not said one's complement of B, and determines a token as A XOR B.

15. The communications channel of claim 14 wherein said Hamming weight coding device passes said two adjacent symbols unchanged when said Hamming weight of said two adjacent symbols is greater than or equal to 3.

16. The communications channel of claim 15 wherein when said Hamming weight of said two adjacent symbols is less than 3, said Hamming weight coding device replaces a first of said two adjacent symbols with said first token, replaces a second of said two adjacent symbols with bit indicators for said two adjacent symbols, and fills remaining bit positions with 1's.

17. A method comprising:
selectively removing X M-bit symbols of user data from a seed set comprising Y M-bit symbols;
selecting a scrambling seed from Y-X symbols remaining in said seed set, where X, Y and M are integers greater than one;
determining a Hamming weight of symbols in scrambled user data that is generated based said user data and said selected scrambling seed; and
selectively coding said symbols depending upon said determined Hamming weight.

18. The method of claim 17 wherein said communications channel is implemented in a data storage system.

19. The method of claim 17 further comprising determining Hamming weights of adjacent symbols in said scrambled user data.

20. The method of claim 17 further comprising removing inverses of symbols in said user data from said seed set.

21. The method of claim 19 further comprising selecting an unused seed S as a first token and a bit-wise inversion of S as a second token.

22. The method of claim 21 further comprising passing said two adjacent symbols unchanged when said Hamming weight of said two adjacent symbols is greater than or equal to 4.

23. The method of claim 22 further comprising replacing a first of said two adjacent symbols with said first token and replacing a second of said two adjacent symbols with a bit indicator of said first of said two adjacent symbols and a mapping of said second of said two adjacent symbols when said Hamming weights of said two adjacent symbols is one of (1,1) and (1,2).

24. The method of claim 23 further comprising indicating a position of a one bit in said first of said two adjacent symbols.

25. The method of claim 24 wherein said bit indicator includes I bits and said mapping maps M bits of said second of said two adjacent symbols to M-I bits.

26. The method of claim 25 further comprising replacing a first of said two adjacent symbols with said second token and a second of said two adjacent symbols with a bit indicator of said second of said two adjacent symbols and a mapping of said first of said two adjacent symbols when said Hamming weights of said two adjacent symbols is (2,1).

27. The method of claim 26 wherein said bit indicator indicates a position of a one bit in said first of said two adjacent symbols.

28. The method of claim 26 wherein said bit indicator includes I bits and said mapping maps M bits of said first of said two adjacent symbols to M-I bits.

29. The method of claim 17 further comprising selecting a first unused seed A and a second unused seed B, wherein A is not said one's complement of B, and determines a token as A XOR B.

30. The method of claim 29 further comprising passing said two adjacent symbols unchanged when said Hamming weight of said two adjacent symbols is greater than or equal to 3.

31. The method of claim 30 further comprising replacing a first of said two adjacent symbols with said first token, replacing a second of said two adjacent symbols with bit indicators for said two adjacent symbols, and filling remaining bit positions with 1's when said Hamming weight of said two adjacent symbols is less than 3.

* * * * *

UNITED STATES PATENT AND TRADEMARK OFFICE
CERTIFICATE OF CORRECTION

PATENT NO. : 7,312,727 B1
APPLICATION NO. : 11/786246
DATED : December 25, 2007
INVENTOR(S) : Weishi Feng et al.

It is certified that error appears in the above-identified patent and that said Letters Patent is hereby corrected as shown below:

Column 3, Line 64      Delete "$_{DO}$" and insert -- $D_o$ --
Column 9, Line 23      Insert -- on -- after "based"

Signed and Sealed this

Twentieth Day of May, 2008

JON W. DUDAS
*Director of the United States Patent and Trademark Office*